United States Patent

Ikuma

Patent Number: 5,303,339
Date of Patent: Apr. 12, 1994

[54] THREE-DIMENSIONAL GRAPHIC PROCESSING APPARATUS

[75] Inventor: Nobuyuki Ikuma, Tokyo, Japan

[73] Assignee: Kabushiki Kaisha Toshiba, Kawasaki, Japan

[21] Appl. No.: 604,131

[22] Filed: Oct. 26, 1990

[30] Foreign Application Priority Data

Oct. 31, 1989 [JP] Japan .................................. 1-281667

[51] Int. Cl.[5] .......................................... G06F 15/62
[52] U.S. Cl. .................................... 395/132; 395/143
[58] Field of Search ............... 395/119, 126, 131, 132, 395/143; 340/728, 742, 744, 793

[56] References Cited

U.S. PATENT DOCUMENTS 4,992,780  2/1991  Penna et al. .................... 395/131 X
5,163,127  11/1992  Ikumi et al. ........................ 395/126

OTHER PUBLICATIONS

1988 IEEE ISSCC Digest of Technical Papers, vol. XXXI, pp. 168-169, "A 32b-3-D Graphic Processor Chip with 10M Pixels/s Gouraud Shading".

*Primary Examiner*—Mark K. Zimmerman
*Attorney, Agent, or Firm*—Finnegan, Henderson, Farabow, Garrett & Dunner

[57] ABSTRACT

A a three-dimensional graphic processing apparatus wherein when a basic figure is subjected to Gouraud shading, an error, which occurs when the calculated value of a horizontal scan start point is rounded to an integer value for raster display, is found, and a luminance value and a depth value obtained by horizontal coordinate linear interpolation, can be corrected on the basis of the found error.

9 Claims, 8 Drawing Sheets

THREE-DIMENSIONAL GRAPHIC PROCESSING APPARATUS

BACKGROUND OF THE INVENTION

1. Field of the Invention

The present invention relates generally to a three-dimensional graphic processing apparatus for performing shading on a three-dimensional figure expressed by a plurality of polygons, and in particularly to a three-dimensional graphic processing apparatus having means for correcting a quantization error caused by rounding real values into integer values for display.

2. Description of the Related Art

In the field of conventional three-dimensional graphic processing, a Gouraud shading method is most common as an algorithm for carrying out three-dimensional display with shading. In the Gouraud shading method, a there-dimensional figure to be described is expressed by a polygon (e.g. a very small triangle). The values of three-dimensional coordinates and luminance of all points within the polygon are obtained by linear interpolation on the basis of data relating to the three-dimensional coordinates and luminance at the apices of the polygon. Thus, the figure is provided with smooth shading.

The Gouraud shading is described in detail in the following documents:

1) "COMPUTER GRAPHICS", J. D. Foley, A. Vandam, translated by Imamiya, Japan Computer Association, P. P. 587-596,
2) NIKKEI ELECTRONICS, 1986, vol. 4.7 (No. 392), P. P. 171-194, and
3) Japanese Patent Application No. 61-227980 (a senior application by the same applicant as the present application).

The Gouraud shading will now be described in brief.

Figure 1:
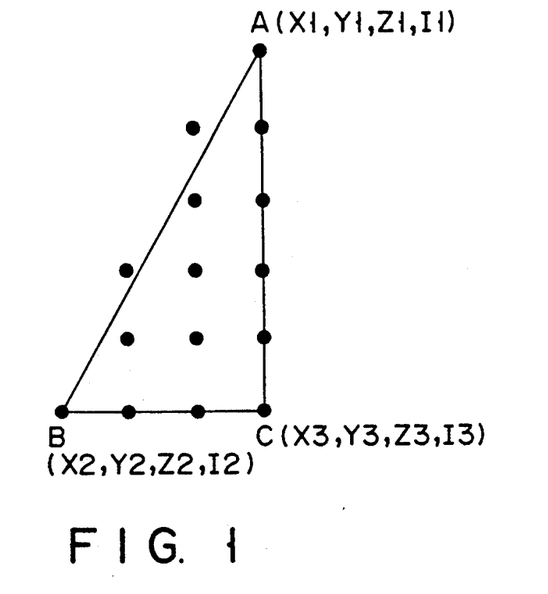
FIG. 1 shows an example of a polygon (basic figure) used in a three-dimensional graphic processing apparatus for performing Gouraud shading, a horizontal scan start point for shading, and points for shading.

Suppose that the polygon is a small triangle as shown in FIG. 1. The values in the three-dimensional coordinates (X-axis, Y-axis, Z-axis) and the value of luminance I at the apices of the triangle are represented by A (X1, Y1, Z1, I1), B (X2, Y2, Z2, I2), C (X3, Y3, Z3, I3). First, the inclination of the values X1, Z1 and I1 on the left side AB and the inclination of the value X2 on the right side AC are obtained.

The inclination $\Delta X1$ of value X1, the inclination $\Delta Z1$ of value Z1, the inclination $\Delta I1$ of value I1 and the inclination $\Delta X2$ of value X2 are given by the following equations:

$$\Delta X1 = \frac{X1 - X2}{Y1 - Y2}, \Delta Z1 = \frac{Z1 - Z2}{Y1 - Y2}$$

$$\Delta I1 = \frac{I1 - I2}{Y1 - Y2}, \Delta X2 = \frac{X1 - X3}{Y1 - Y3}$$

Since the figure is a triangle, the inclination $\Delta Ia$ of value I and the inclination $\Delta Za$ of value Z on a horizontal line (parallel to the Y-axis) have constant values, and are given by $$\Delta Ia = \frac{I3 - I2}{X3 - X2}$$

$$\Delta Za = \frac{Z3 - Z2}{X3 - X2}$$

The inclinations $\Delta X1$, $\Delta Z1$ and $\Delta I1$ on the left side AB are added to the X-axis coordinate X2, Y-axis coordinate Y2, and Z-axis coordinate Z2 at the apex B, thereby finding the coordinates values (Xs, Zs and Is) at the horizontal scan start point. Then, the inclination $\Delta X2$ on the right side AC is added to the X-axis coordinate X2 of the apex B, thereby obtaining the coordinate value Xe at the horizontal scan end point. The inclinations $\Delta Ia$ and $\Delta Za$ on the horizontal line are added to Is and Zs over the line from Xs to Xe, thus finding values I and Z at each point.

In this manner, the figure is entirely scanned horizontally. All arithmetic operations for the scan are performed in the three-dimensional graphic processing apparatus on the basis of real numbers with a given precision (e.g. double precision). Thus, the coordinates values Xs, Zs and Is on the left side, the coordinate value Xe on the right side, and the inclinations are all represented by real numbers.

Figure 2:
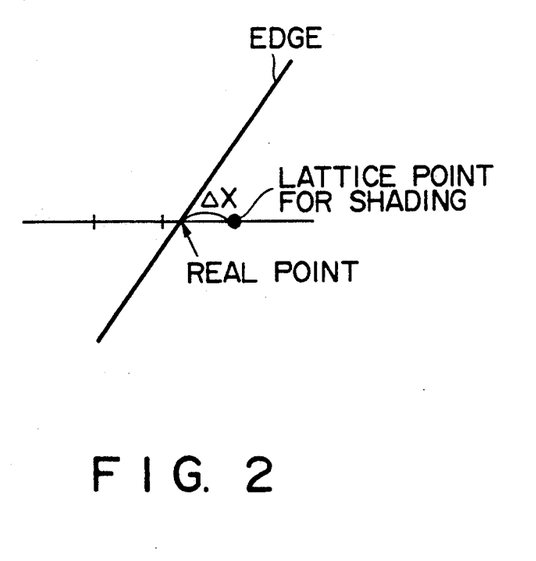
FIGS. 2 and 3 show the state wherein a displacement $\Delta x$ (round-off error) occurs between a horizontally scanned real point in a polygon and a shading point, when the real point is quantized for shading performed by a conventional three-dimensional graphic processing apparatus, and the state wherein an edge point calculated in the apparatus is displaced in parallel from a real edge of the polygon when 0.5 is added to round the calculated value.

Although the arithmetic operations are performed in the three-dimensional graphic processing apparatus on the basis of real values, a final three-dimensional figure is obtained by quantizing and rounding the real values to integer values at an integer-number of lattice points (pixel points) on the display screen of a display (normally, a raster display). Accordingly, as is shown in FIG. 2, a displacement (round-off error) $\Delta x$ occurs between a real point and a lattice point for shading. Thus, the luminance I and depth Z at each point for shading have round-off errors $\Delta x \cdot \Delta Ia$ and $\Delta x \cdot \Delta Za$.

Figure 3:
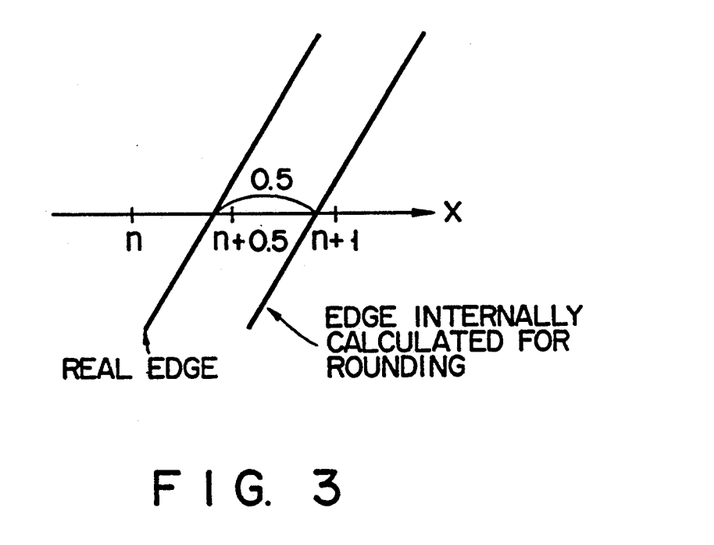

When the X-coordinate value Xs at the start point on the left side of the triangle is obtained, 0.5 is added to the initial value (e.g. X2 at point B) for rounding. Finally, a decimal fraction of the initial value is omitted and the value is rounded to an integer value. Then, as is shown in FIG. 3, the real edge of the figure and the internally calculated edge point for rounding are parallel with an error of 0.5. In this case, $\Delta x < 0.5$. If the values $\Delta Ia$ and $\Delta Za$ are very large, the error of each point increases. In the boundary of two figures, a single point may have different calculated values, and the boundary may be displayed in a zigzag fashion.

As has been described above, in the conventional three-dimensional graphic processing apparatus, the arithmetic operations are performed on the basis of real numbers, but the real numbers are rounded for the shading process. Thus, a displacement appears between the real edge of a figure and the point for shading, and an error occurs in calculation results relating to the boundary of two figures. As a result, the boundary is displayed discontinuously.

SUMMARY OF THE INVENTION

The object of the present invention relates to a three-dimensional graphic processing apparatus wherein when a calculated real value is rounded to an integer value for shading, an error between a real edge of a figure and a shading point can be corrected and the calculation results relating to boundary portions of two figures coincide substantially, whereby a natural and continuous shading image on the boundary of the figures can be obtained, and also a high-quality image can be obtained.

A three-dimensional graphic processing apparatus according to a preferred embodiment of the present invention comprises:

means for adding 0.5 to the calculated result of the coordinate value of a horizontal scan start point on a left side of a basic figure, and rounding the result value to an integer value;

first means wherein when the first digit place of the value, which was obtained by adding 0.5 to the calculated value of the horizontal scan start point on the left side of the basic figure, is 1, the second to n-th places of the digits are obtained as an error, in the horizontal coordinate, and, when the first digit place of said value is 0, a complement of 2 for the second to n-th digit places is obtained as the error in the horizontal coordinate;

second means for finding a correction value by multiplying the error in the horizontal coordinate by the inclination of luminance with respect to the horizontal direction, and finding a correction value by multiplying the error in the horizontal direction by the inclination of depth with respect to the horizontal direction; and third means wherein when the first digit place of the value, which was obtained by adding 0.5 to the luminance and depth values calculated by the horizontaldirectional linear interpolation, is 1, the correction value obtained by said second means is subtracted, and when the first digit place is 0, the correction value obtained by said second means is added.

As has been stated above, according to the preferred three-dimensional graphic processing apparatus of the present invention, when a calculated real value is rounded to an integer value for shading, an error between a real edge of a figure and a shading point can be corrected and the calculation results relating to boundary portions of two figures coincide substantially, whereby a natural and continuous shading image on the boundary of the figures can be obtained, and also a high-quality image can be obtained.

In addition, according to the preferred three-dimensional graphic processing apparatus of the present invention, the hardware necessary for adding an error correction means to a conventional three-dimensional graphic processing apparatus may have a simple structure. Specifically, the hardware may comprises only such parts as an adder/subtracter (conventional one), a rotator, a complement-of-2 circuit and a register.

According to the preferred embodiment of the present invention, the operation of the error correction means can be ON/OFF controlled, depending on the case where the image quality needs to be enhanced with high precision, and the case where a high-speed operation, rather than precision, is required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 4:
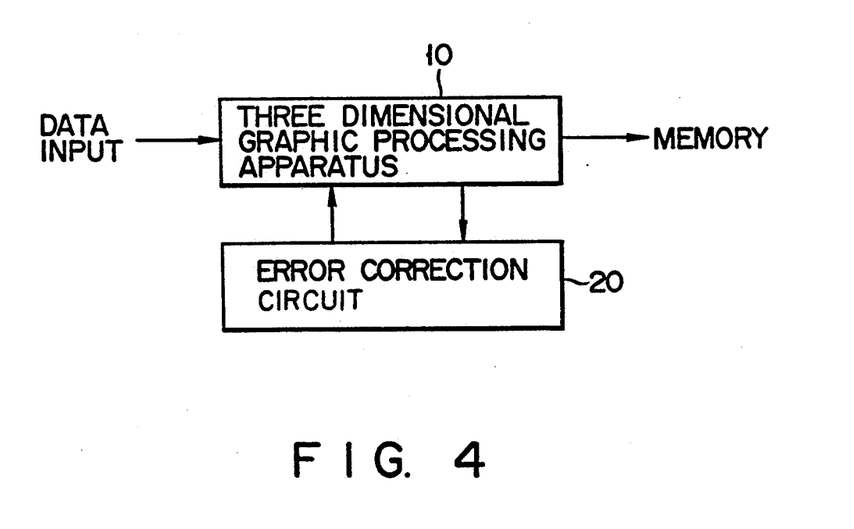
FIG. 4 is a block diagram showing a basic structure of the three-dimensional graphic processing apparatus of the present invention.

FIG. 4 shows a three-dimensional graphic processing apparatus 10 in an integrated circuit. The graphic processing apparatus 10 does not carry out the conventional error correction operation explained with reference to FIGS. 1 to 3. This apparatus 10 is connected to error correction circuit 20. The error correction circuit 20 finds an error $\Delta x$, which occurs when the calculation result of a horizontal scan start point Xs on the left side of a polygon (basic figure) is rounded down to an integer, value, for raster display. Thus, the error correction circuit 20 corrects the luminance value and the depth value obtained by the horizontal-directional linear interpolation, on the basis of the error $\Delta x$.

In this embodiment, the calculation result of the horizontal scan start point Xs on the left side of the polygon is rounded to a integer value for raster display, in the following manner. The value 0.5 is added to the calculation result of the horizontal scan start point Xs on the left side of the basic figure, and the resultant value is rounded to an integer value. As a result, as shown in FIG. 2, an error $\Delta x$ ($<0.5$) occurs between the real point of the figure and the shading point. The luminance I and the depth Z of the shading point must be corrected by $\Delta x \cdot \Delta Ia$ and $\Delta x \cdot \Delta Za$ in relation to the real point on the edge. The values $\Delta x \cdot \Delta Ia$ and $\Delta x \cdot \Delta Za$ represent the inclination of the luminance I and the inclination of the depth Z on a horizontal line (parallel to the Y-axis).

The error correction circuit 20 comprises a first circuit, second circuit and a third circuit.

The function of the first circuit will now be described. When the digit first place of the value, which was obtained by adding 0.5 to the calculated value of the horizontal scan start point on the left side of the basic figure in the rounding step, is 1, the first circuit obtains the second to n-th places as an error $\Delta x$ in the horizontal coordinate. When the digit first place is 0, the first circuit obtains a complement of 2 for the second to n-th places as the error $\Delta x$ in the horizontal coordinate.

The second circuit of the error correction means 20 a correction value $\Delta x \cdot \Delta Ia$ by multiplying the error $\Delta x$ by the inclination $\Delta Ia$ of luminance with respect to the horizontal direction. In addition, the second circuit finds a correction value $\Delta x \cdot \Delta Za$ by multiplying the error $\Delta x$ by the inclination $\Delta Za$ of depth with respect to the horizontal direction.

The third circuit of the error correction circuit 20 operates as follows. When the first place of the value, which was obtained by adding 0.5 to the luminance and depth values calculated by the horizontaldirectional linear interpolation in the rounding step, is 1, the third circuit subtracts the correction value obtained by the second circuit. When the first place is 0, the third circuit adds the correction value obtained by the second circuit.

Figure 5A:
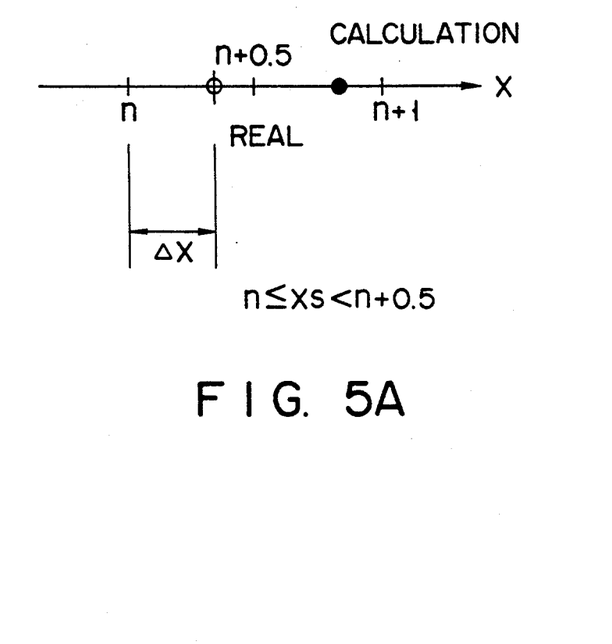
FIGS. 5A and 5B show the states wherein the horizontal scan start point Xs is represented by $n \leq Xs < n+0.5$ and $n+0.5 \leq Xs < n+1$, after 0.5 was added to round the horizontal scan start point on the left side of the basic figure shown in FIG. 1.
Figure 5B:
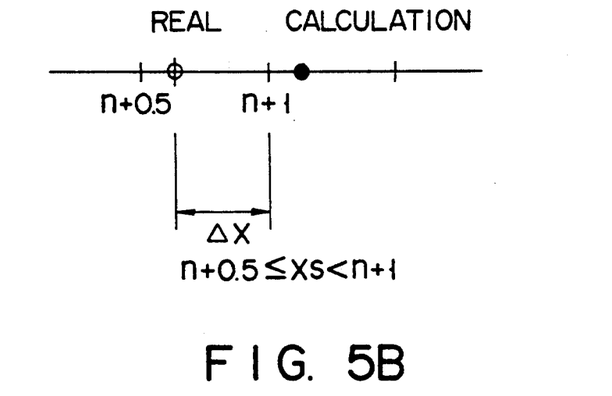

The method of finding the error $\Delta x$ and the method of correcting the values $\Delta x \cdot \Delta Ia$ and $\Delta x \cdot \Delta Za$ are different between the case where the horizontal scan start point Xs is n (integer) $\leq Xs < n+0.5$, as is shown in FIG. 5A, and the case where the horizontal scan start point Xs is $n+0.5 \leq Xs < n+1$, as is shown in FIG. 5B.

Where the horizontal scan start point Xs is n (integer)$\leq Xs < n+0.5$, as is shown in FIG. 5A, the value calculated in the three-dimensional graphic processing apparatus includes "1" at the first digit place, like "0.11011 . . . ". Thus, the value at the second to n-th digit places (0.01011 . . . ) is obtained as error $\Delta x$. The correction values $\Delta x \cdot \Delta Ia$ and $\Delta x \cdot \Delta Za$ obtained by the second circuit are present on the positive size of X. Thus, in the third circuit, the correction values $\Delta x \cdot \Delta Ia$ and $\Delta x \cdot \Delta Za$ obtained by the second circuit are subtracted from the luminance value and the depth value obtained by the linear interpolation calculation of the horizontal coordinate.

By contrast, where the horizontal scan start point Xs is $n+0.5 \leq Xs < n+1$, as is shown in FIG. 5B, the value calculated in the three-dimensional graphic processing apparatus includes "0" at the first digit place, like "0.01100 . . .". Thus, the complement of 2 of the value at the second to n-th digit places (0.00100 . . . ) is obtained as error $\Delta x$. The correction values $\Delta x \cdot \Delta Ia$ and $\Delta x \cdot \Delta Za$ obtained by the second means are present on the positive size of X. Thus, in the third circuit the correction values $\Delta x \cdot \Delta Ia$ and $\Delta x \cdot \Delta Za$ obtained by the second circuit are added to the luminance value and the depth value obtained by the linear interpolation calculation of the horizontal coordinate.

The number of digit places to be calculated depends on the precision required. In practice, the calculation to the fifth or sixth point is sufficient. In this case, the error is $2^{-6}$ to $2^{-7}$.

It can be considered that when the correction values $\Delta x \cdot \Delta Ia$ and $\Delta x \cdot \Delta Za$ are calculated, the precision is enhanced by use of multipliers. When the calculation is performed with double precision, if $\Delta x$ is 16 bits and $\Delta Ia$ and $\Delta Za$ are 32 bits respectively, multipliers of 16 bits $\times$ 32 bits are required.

In the prior art, when linear interpolation is performed, it is sufficient that an increment of variation is added to the previous value, and hardware may have a simple structure. For example, adders and registers may be used as hardware.

Figure 6:
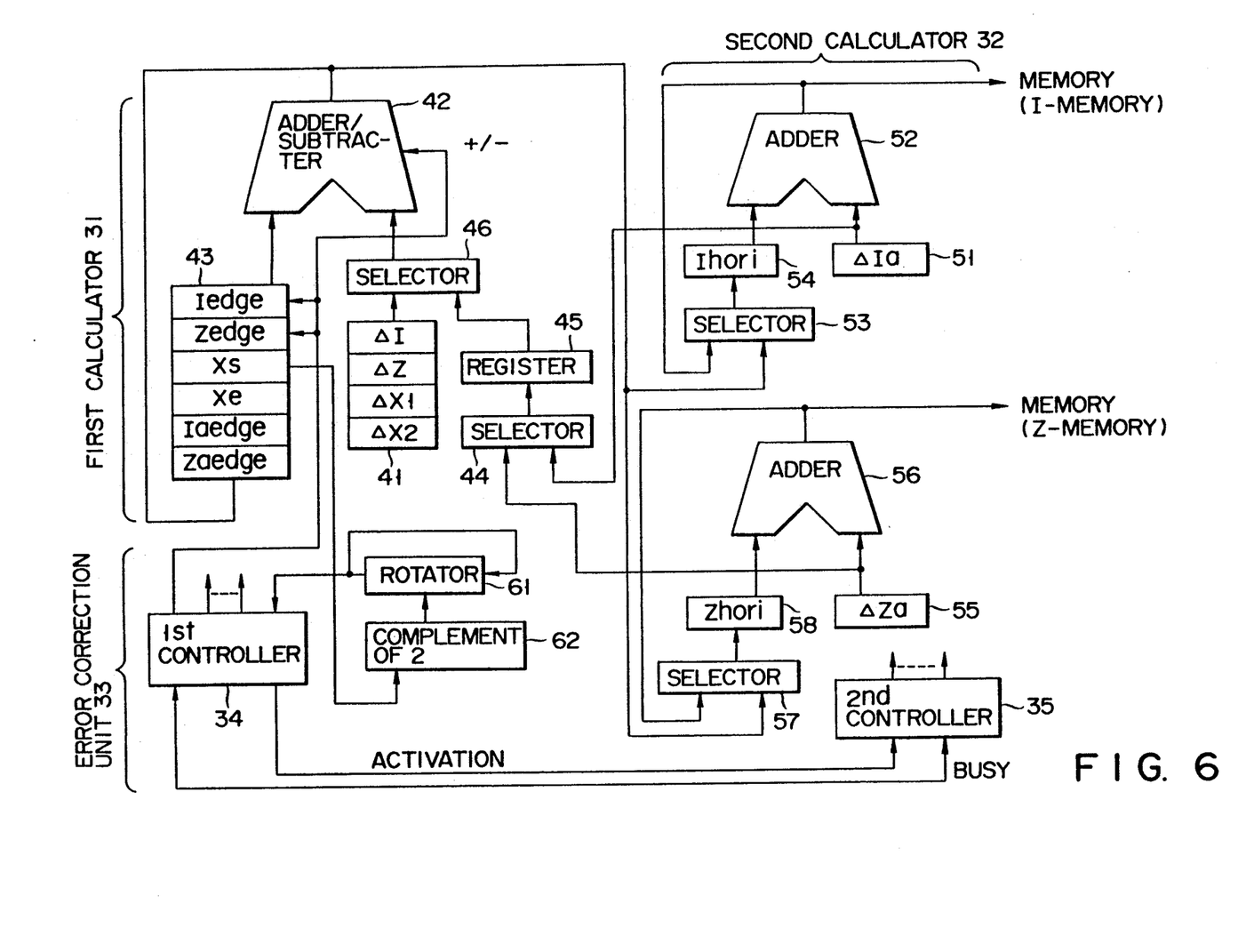
FIG. 6 is a block diagram showing an example of the three-dimensional graphic processing apparatus of the present invention.

Under the situation, it is desirable that the error $\Delta x$ is corrected by hardware with high performance, without using multipliers. Referring to FIG. 6, a description will now be given of the case where the shift and addition are repeated, for example, with use of adders/subtracters, rotators (bit rotation circuits), and registers.

A three-dimensional graphic processing apparatus shown in FIG. 6 comprises a first calculator 31, a second calculator 32 and an error correction unit 33. The first calculator 31 calculates the luminance I and depth Z on the edge of the side AB of the polygon, the X-coordinate value Xs of the start point, and the X-coordinate value Xe of the end point. The second calculator 32 performs interpolation for the luminance and depth along a horizontal line between the start point Xs to the end point Xe and outputs the calculation results, as write inputs, to, for example, external memories (I memory and Z memory) which are provided outside the integrated circuit.

The first calculator 31 comprises registers 41 for storing data relating to various inclinations on the edge, an adder/subtracter 42 for receiving the data from the registers 41 as one input, and performing interpolation, and registers 43 for storing various values on the edge, which are output from the adder/subtracter 42. For the error correction operation, the first calculator 31 further comprises a first selector 44 for selecting one of the luminance inclination $\Delta Ia$ and depth inclination $\Delta Za$ supplied from the second calculator 32, a resistor 45 for storing the inclination selected by the first selector 44, and a second selector 46 for selecting either one of the content of the register 45 and the content of the register group 41 for storing the various inclinations on the edge, and supplying the selected content to the adder/subtracter 42 as the other input. The operation of these elements is controlled by a first controller 34 on the basis of programs.

The second calculator 32 comprises a register 51 for storing data relating to the luminance inclination $\Delta Ia$, an adder 52 for receiving the data from the register 51 as one input and performing interpolation for the luminance in the horizontal direction, a selector 53 for selecting either one of a luminance output from the adder/subtracter 42 and an output from the adder 52, a register 54 for storing data relating to the luminance of the point selected by the selector 53, a register 55 for storing the depth inclination $\Delta Za$, an adder 56 for performing interpolation for the depth in the horizontal direction, a selector 57 for selecting either one of a depth output from the adder/subtracter 42 and an output from the adder 56, and a register 58 for storing data relating to the depth of the point selected by the selector 57. The operation of these structural elements is controlled by a second controller 35 on the basis of programs.

The second controller 35 is activated by the first controller 34. While the second controller 35 is in operation, a busy flag is indicated for the first controller 34.

The error correction unit 33 comprises a rotator 61 and a complement-of-2 circuit 62, and uses the adder/subtracter 42, part of the register group 43, register 45, first selector 44 and second selector 46. The operation of the error correction unit 33 is controlled by the first controller 34 on the basis of programs.

The basic operation of the above-described three-dimensional graphic processing apparatus will now be described with reference to flowcharts of FIGS. 7 to 10.

Figure 7:
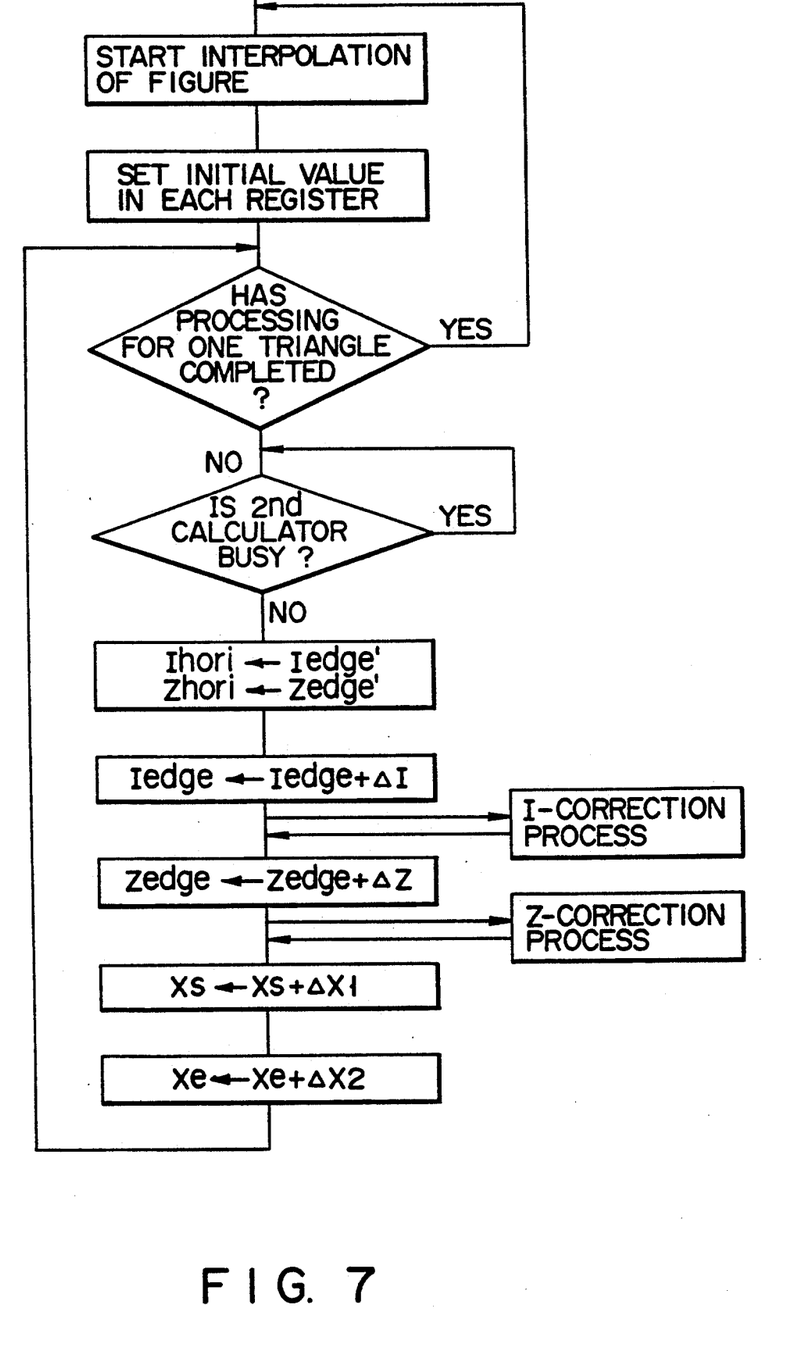
FIGS. 7 and 8 are flowcharts illustrating the interpolation operation for the horizontal scan point along the left side of the basic figure, which is carried out by the first calculation unit in the three-dimensional graphic processing apparatus shown in FIG. 6, and the interpolation operation for the luminance and depth in the horizontal direction, which is carried out by the second calculation unit.

The flowchart of FIG. 7 illustrates the operation of interpolation for the left side of a polygon, which is carried out by the first calculator 31. First, initial values for a given polygon are set in the registers 41 and 43. When the second controller 35 is not busy, the values Ia edge and Za edge on the edge, which are set in the registers 43, are transferred to the registers 54 and 58 in the second calculator 32.

The adder/subtracter 42 adds the luminance inclination $\Delta I$ set in the registers 41 to the edge value I edge set in the registers 43. The added value is stored in the registers 43. On the basis of the added result, an I-correction process is performed, as will be described later. Subsequently, the adder/subtracter 42 adds the depth inclination $\Delta Z$ set in the registers 41 to the edge value Z edge set in the registers 43. The added value is stored in the registers 43. On the basis of the added result, a Z-correction process is performed, as will be described later.

Subsequently, the adder/subtracter 42 adds the inclination $\Delta X1$ set in the registers 41 to the X-coordinate value Xs of the start point set in the registers 43. The added value is stored in the registers 43. The adder/subtracter 42 adds the inclination $\Delta X2$ set in the registers 41 to the X-coordinate value Xe of the end point set in the registers 43. The added value is stored in the registers 43. This operation is repeated until the processing for one polygon is completed.

Figure 8:
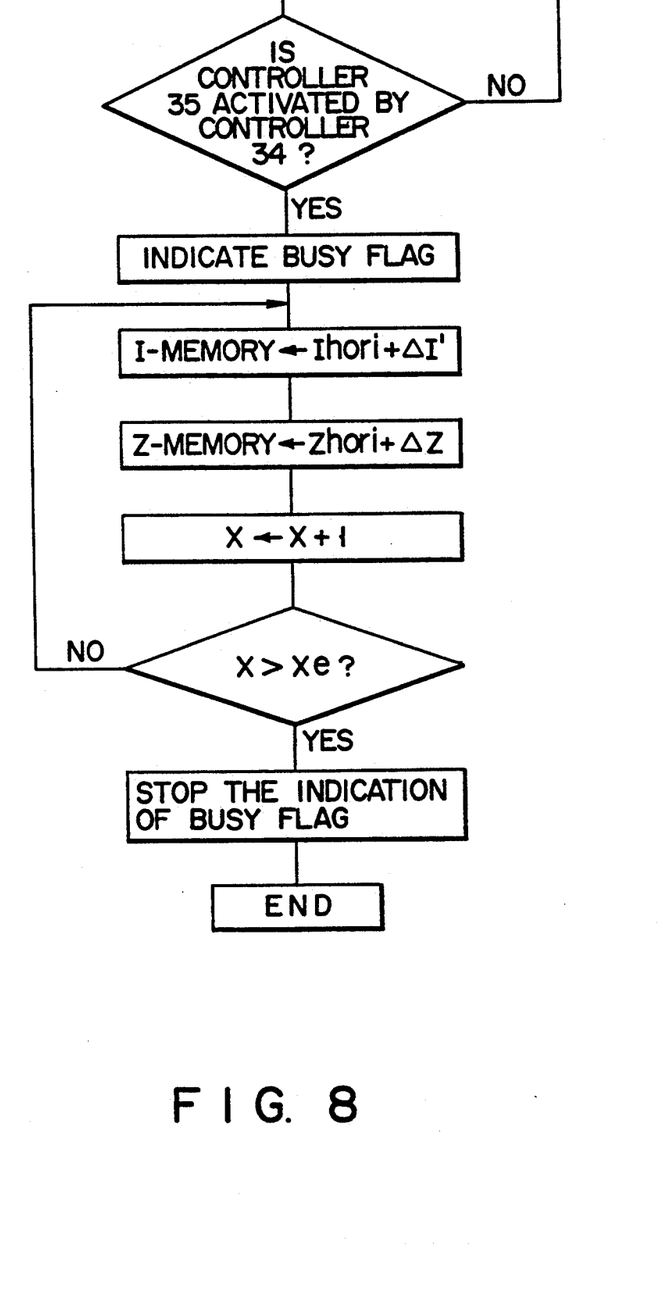

The flowchart of FIG. 8 illustrates the operation of interpolation for the luminance I and depth Z in the horizontal direction, which is carried out by the second calculator 32. When the second controller 3 is activated by the first controller 34, a busy flag is indicated for the first controller 34. The adder 52 adds the inclination $\Delta Ia$ of luminance I on the horizontal line, which is set in the register 51, to the content of the register 54. The added value is transferred to an external I-memory. The adder 56 adds the inclination $\Delta Za$ of depth Z on the horizontal line, which is set in the register 55, to the content of the register 58. The added value is transferred to an external Z-memory. The content of a horizontal counter X (not shown) is incremented by one, and the above operation is repeated until the value of the counter X becomes greater than the X-coordinate value Xe of the end point. Thereafter, the indication of the busy flag is stopped. Thus, the horizontal inclinations $\Delta Ia$ and $\Delta Za$ are added to the luminance I and depth Z over the distance between the X-coordinate point Xs of the start point to the X-coordinate point Xe of the end point, thereby obtaining the values of I and Z at each point.

Figure 9:
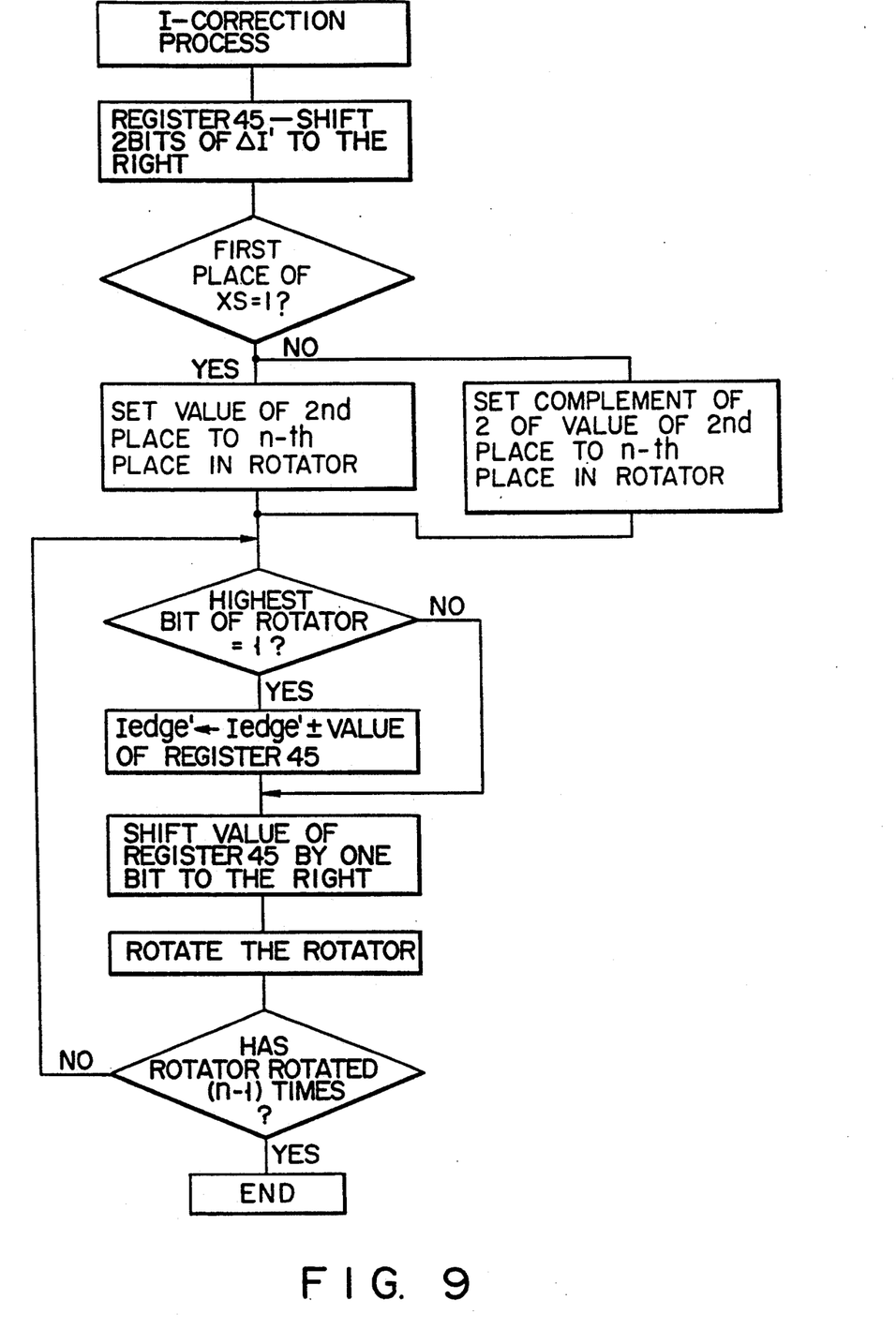
FIGS. 9 and 10 show an I-correction process routine in the flowchart of FIG. 7, which is carried out by the error correction unit in the three-dimensional graphic processing apparatus, and a flowchart for illustrating the operation corresponding to a Z-correction processing routine.
Figure 10:
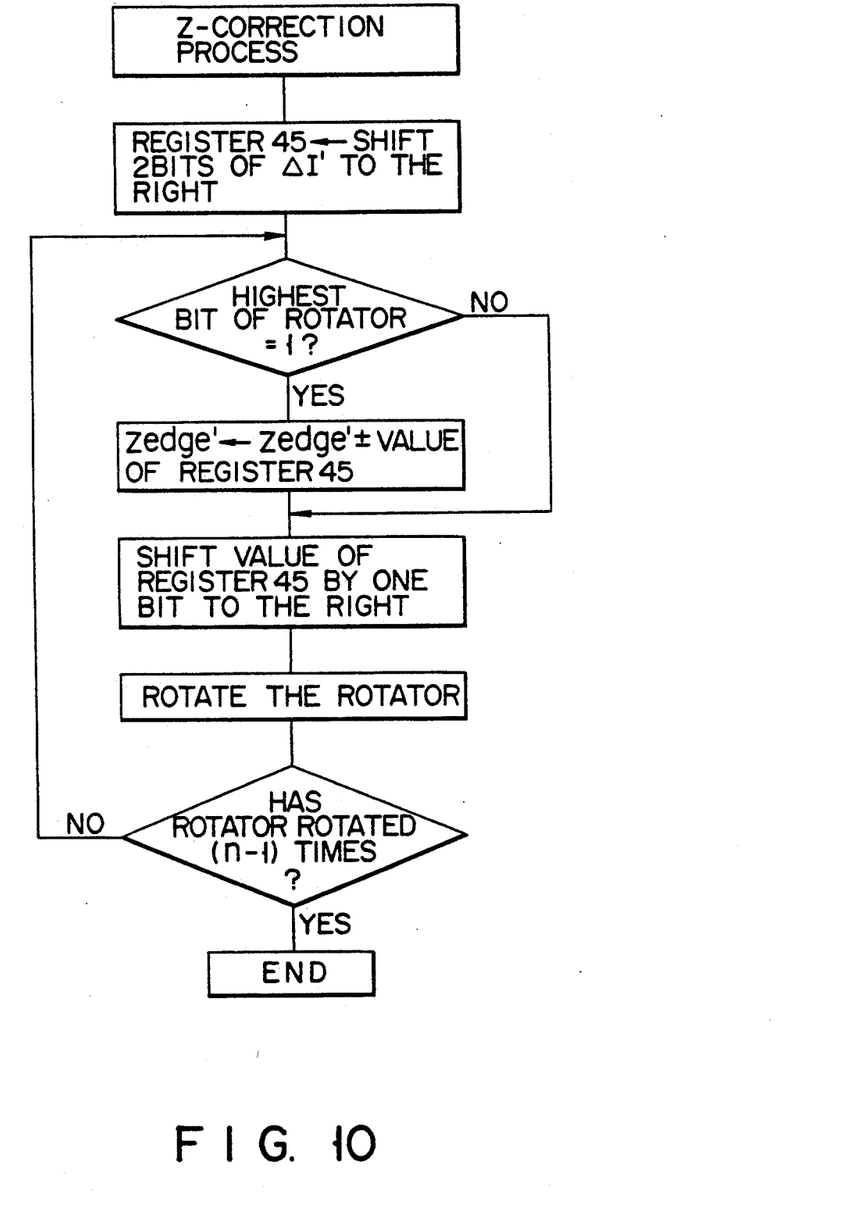

The flowchart of FIG. 9 illustrates the operation of the error correction unit 33 corresponding to the I-correction process routine in the flowchart of FIG. 7, and the flowchart of FIG. 10 illustrates the operation of the error correction unit 33 corresponding to the Z-correction process routine in the flowchart of FIG. 7.

Basically, the horizontal inclination $\Delta Ia$ (or $\Delta Za$) set in the register 51 (or 55) is shifted to the right by two bits (i.e. divided by 4). The resultant is stored in the register 45. The value $\Delta x$ is set in the rotator 61, taking account of the first place of the X-coordinate value Xs of the start point set in the registers 43. If the highest bit of the rotator 61 is 1, the adder/subtracter 42 performs addition or subtraction (subtraction when the first place is 1; addition when the first place is 0 with respect to the content of the register 45 and the edge value Ia edge (or Za edge) stored in the registers 43. The resultant value is stored in the registers 43. Then, the content of the register 45 is shifted to the right by one bit, the rotator 61 is rotated, and the shift/addition operation is performed for the second place to the n-th decimal place (n−2 times). Since the rotator 61 is restored to the original state by (n−1) rotational operations, it is not necessary to set $\Delta x$ in the rotator 61 in the Z-correction process routine.

The hardware preferred three-dimensional graphic processing apparatus of the present invention is constructed such that the error correction circuit is added to the conventional three-dimensional graphic processing apparatus wherein error correction is not effected. In the above-described embodiment, the error correction circuit is operated to enhance the precision of the apparatus and to attain a high image quality. When the high-speed operation, rather than the precision, of the apparatus is required, the error correction circuit may not be operated.

For example, the operation of the error correction may be turned on/off in response to a switch control input applied from the outside of the integrated circuit by a user. In the case of the three-dimensional graphic processing apparatus shown in FIG. 6, a switching control signal may be applied to the first controller 34 and the control program may be changed such that when the error correction is not operated, a jump to the I-correction process routine and to the Z-correction process routine in the flowchart of FIG. 7 is prohibited.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of shading a graphic figure to be displayed on a graphics apparatus having a plurality of pixel locations, the method including the steps, performed by a processor, of:
   generating a first signal representing a side of the graphic figure;
   extracting a point from the first signal to produce an extracted point;
   determining a luminance for the extracted point;
   determining a pixel location corresponding to the extracted point; and
   adjusting the luminance based on a spatial difference between the extracted point and the corresponding pixel location.

2. The method according to claim 1, wherein the step of determining a pixel location includes the substep of
   adding 0.5 to a coordinate of the extracted point to produce a result having a plurality of digits, and rounding the result, and wherein the adjusting step includes the substep of
   determining an error to be a group of digits of the result when a digit preceding the group of digits is non-zero, and determining the error to be the two's complement of the group of digits when the preceding digit is 0;

multiplying the error by an inclination of luminance to produce an adjusting value; and subtracting the adjusting value from the luminance determined in the luminance determining step.

3. The method according to claim 2, wherein the multiplying step includes the substep of shifting the inclination of luminance.

4. The method according to claim 3, further including the step of determining a depth for the extracted point, wherein the multiplying step includes the substep of multiplying the error by an inclination of depth to produce a second adjusting value, and wherein the subtracting step includes the substep of subtracting the second adjusting value from the depth determined in the depth determining step.

5. The method according to claim 2, further including the step of determining a depth for the extracted point, wherein the multiplying step includes the substep of multiplying the error by an inclination of depth to produce a second adjusting value, and wherein the subtracting step includes the substep of subtracting the second adjusting value from the depth determined in the depth determining step.

6. The method according to claim 1, further including the step of selectively disabling the adjusting step.

7. The method according to claim 6, further including the step of determining a depth for the extracted point, wherein the multiplying step includes the substep of multiplying the error by an inclination of depth to produce a second adjusting value, and wherein the subtracting step includes the substep of subtracting the second adjusting value from the depth determined in the depth determining step.

8. The method according to claim 1, wherein the step of determining a pixel location includes the substep of adding a constant to a coordinate of the extracted point to produce a result having a plurality of digits, and rounding the result, and wherein the adjusting step includes the substep of determining an error to be a group of digits of the result when a digit preceding the group of digits is non-zero, and determining the error to be the two's complement of the group of digits when the preceding digit is 0;

multiplying the error by an inclination of luminance.

9. The method of according to claim 8, further including the step of determining a depth for the extracted point, wherein the multiplying step includes a substep of multiplying the error by an inclination of depth.

* * * * *

UNITED STATES PATENT AND TRADEMARK OFFICE
CERTIFICATE OF CORRECTION

PATENT NO. : 5,303,339
DATED : April 12, 1994
INVENTOR(S) : Nobuyuki Ikumi

It is certified that error appears in the above-indentified patent and that said Letters Patent is hereby corrected as shown below:

On the title page, Item [75] Inventors:

Inventor's last name beneath "United States Patent" change "Ikuma" to --Ikumi--.

at Inventor: change "Ikuma" to --Ikumi--.

Abstract, line 1, of delete "a".

Claim 8, column 10, line 18 and 19, delete "the two's complement" and insert --a negation--.

Signed and Sealed this

Twentieth Day of December, 1994

Attest:

BRUCE LEHMAN

Attesting Officer    Commissioner of Patents and Trademarks